United States Patent [19]

Zur

[11] Patent Number: 4,833,490

[45] Date of Patent: May 23, 1989

[54] WRITING ELEMENT WITH EXCHANGE MECHANISM

[75] Inventor: Reinhard Zur, Hamburg, Fed. Rep. of Germany

[73] Assignee: Koh-I-Noor Rapidograph, Inc., Bloomsbury, N.J.

[21] Appl. No.: 100,867

[22] Filed: Sep. 25, 1987

[30] Foreign Application Priority Data

Sep. 26, 1986 [DE] Fed. Rep. of Germany ....... 3632656

[51] Int. Cl.⁴ ........................ G01D 15/16; G01D 9/30

[52] U.S. Cl. .................................. 346/139 R; 346/29; 346/46; 346/49; 346/141

[58] Field of Search ............... 346/139 R, 140 R, 141, 346/27, 46, 49, 139 A, 139 B, 139 C, 139 D

[56] References Cited

U.S. PATENT DOCUMENTS 3,880,294 4/1975 Arseneault .
4,135,245 1/1979 Kemplin et al. .
4,288,798 9/1981 Hollmayer .
4,401,996 8/1983 Shirahata ........................ 346/139 R
4,417,258 11/1983 Tribolet et al. .
4,489,333 12/1984 Anderka et al. ................ 346/139 R
4,496,958 1/1985 Brandt et al. .
4,577,409 3/1986 Sakamoto et al. .

FOREIGN PATENT DOCUMENTS 1461643 3/1969 Fed. Rep. of Germany .
1516834 4/1970 Fed. Rep. of Germany .

*Primary Examiner*—E. A. Goldberg
*Assistant Examiner*—Mark Reinhart
*Attorney, Agent, or Firm*—Fitzpatrick, Cella, Harper & Scinto

[57] ABSTRACT

In a device for exhanging objects, in particular writing instruments, between two holders (4, 5) open on one side, in which the object (6) is retained at least in one holder (4) by the cooperation of two retaining elements, one of which is a permanent magnet and the other is a ferromagnetic element. The retaining element provided in the one holder (4) is connected to a raceway mechanism and in the retaining position is disposed at least near the receiving zone of the holder (4), and in the separating position is located farther away from the receiving zone of the holder (4).

3 Claims, 2 Drawing Sheets

WRITING ELEMENT WITH EXCHANGE MECHANISM

BACKGROUND OF THE INVENTION

1. Field of the Invention

The invention relates to a device for exchanging objects, in particular writing instruments, between two holders open on one side. For the transfer of an object, these holders are movable relative to one another by an approach in a plane extending substantially at right angles to their longitudinal axes. The object is retained in at least one holder by the cooperation of two retaining elements, one being a permanent magnet and the other a ferromagnetic element. In the retaining position, the retaining elements face one another close together, and in the separating position they are spaced farther apart from one another than in the retaining position.

2. Brief Description of the Prior Art

In a known device of this type (German Patent No. 32 26 455, corresponding to ANDERKA et al., U.S. Pat. No. 4,489,333) the object to be exchanged must be substantially in the shape of a regular convex-n-gon and must have a retaining element at each corner, each holder having a different retaining element in the receiving zone. In the retaining position, the retaining elements are located directly opposite one another. Hence, in removing the object from the one holder, the other holder is moved obliquely toward the holder having the object. A rotating of the object in its holder thereby displaces the retaining elements counter to one another. Meanwhile, in the position it has attained, the holder effecting the rotation has moved its retaining element into a position adjacent to a retaining element holding the object, so that the object is now held by this holder through magnetic action. By shifting this holder, the object can be moved out of the other holder, in which the retaining elements were spaced farther apart from one another.

In this known device, the object must have a quite specific, relatively complicated shape; moreover, the holder that is to receive the object must move obliquely toward the holder holding the object and then the initially obliquely moved holder must move away again, (now carrying the object), along a different, straight path. In other words, the holder must be moved under control along a relatively complicated path.

In another known device (German Patent No. 31 45 904, corresponding to BRANDT et al., U.S. Pat. No. 4,496,958) the holder that is moved toward the other holder for removing or inserting an object is moved back and forth along a straight line; i.e., it travels a very simple path of movement. In this device, the object in one holder is retained by two opposed leaf springs, which grip a short way around the object with their ends and press it against a stationary inside face, opposite the opening of the holder, of the receiving zone. The free ends of the leaf springs protrude somewhat in the direction of the transfer of the object to the other holder, and this other holder has two correspondingly embodied springs. If the object is held in one holder which approaches the other holder, then the free ends of the springs of the other holder, (because of the absence of an object therein), are spaced more closely together than the free ends of the first holder, (being forced apart by the object inserted therein). As a result, the free ends of the springs of the other holder come into contact with the outer circumference of the object, and upon further approach of the first holder to the other holder are spread apart. Because they are thus spread apart, the protruding free ends of the springs contact the first holder and force their way in between these springs and the object, until their free ends encompass the object and therefore pull it out of this first holder upon reversal of the motion of that holder.

When an object is inserted from the other holder into the first holder, the springs operate in the same manner as described above, but in that case the springs of the first holder force their way in between the springs of the second holder and engage the object.

In this known device, the location of the object in the holders is not defined precisely, because it is substantially determined by the properties of the two springs, which can change in the course of operation. Furthermore, its mechanical structure is relatively complicated and expensive.

OBJECTS AND SUMMARY OF THE INVENTION

It is the object of the invention to provide a device for exchanging objects, in particular writing instruments, that is simple in both structure and function.

To attain this object, a device of the type described above is embodied in accordance with the invention such that the retaining element provided in a holder is connected to a raceway mechanism, and in the retaining position is located at least near the receiving zone of the holder and in the separating position is located farther away from the receiving zone of the holder.

In the device according to the invention, a raceway mechanism of a type typically used with ball point pens is used for shifting the retaining elements relative to one another. The retaining element located in the holder, which may be a permanent magnet thereby is shifted between the retaining position and the separating position. This kind of raceway mechanism is simple and reliable in structure, making possible a correspondingly simple and reliable structure of the device according to the invention.

It should be noted that in many applications, such as use as a writing instrument changing device in a plotter, only the holder provided in the writing instrument magazine may be equipped with a raceway mechanism. The holder in the writing head may retain the writing instrument in some other manner, for instance, by means of a magnetic force that is less than the magnetic force operative between the holder having the raceway mechanism and the writing instrument, when retaining elements are located in the retaining position.

The portion of the holder having the receiving zone can be movable counter to the spring force of the raceway mechanism, out of a position of repose into a reversing position. The position of repose corresponds to the retaining position of the retaining element, and the reversing position corresponds to its separating position.

The retaining element may be secured to the forward end of a pin that extends in a bore in a portion of the holder having the receiving zone and with respect to which this portion is axially movable. Hence, the retaining element is shifted by shifting of the portion of the holder having the receiving zone between the position of repose, in which the retaining element is located adjoining the receiving zone, and the reversing position, in which the retaining element is located farther away from the receiving zone.

The raceway mechanism can be embodied for this purpose in the portion of the holder having the receiving zone.

The invention will now be described in further detail, referring to the drawings.

DESCRIPTION OF THE PREFERRED EMBODIMENT

Figure 1:
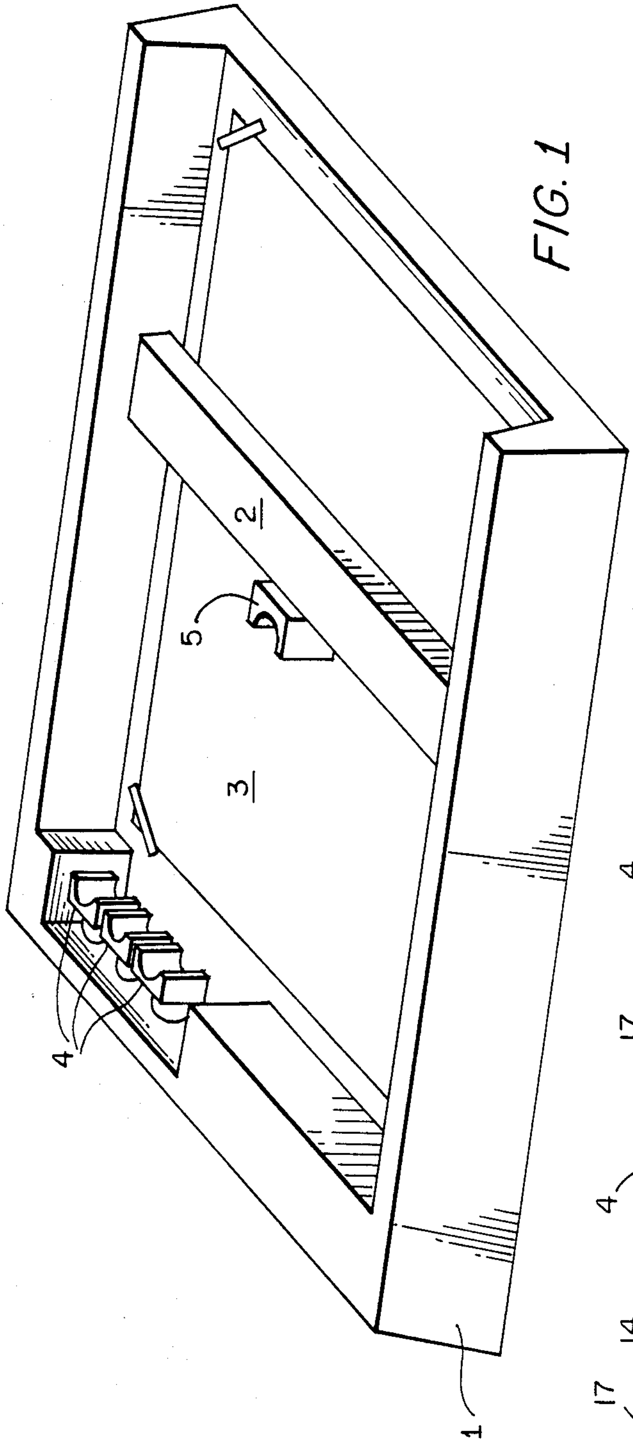
FIG. 1, in a simplified, perspective view, shows a plotter having a magazine for writing instruments, or pens, that has three holders, one holder forming a portion of the writing head.

The invention will be described below in terms of a writing instrument or pen changing device such as can be used in the flat bed plotter 1 shown in FIG. 1, which has a traveling beam 2 movable back and forth in one direction over the drawing surface 3. On this beam, a drawing head, (not shown), is secured with a holder 5. The drawing head is conventionally moved back and forth in the beam 2 in the longitudinal direction thereof. Also shown, in a highly simplified and schematic fashion, are holders 4 of a writing instrument or pen magazine, which are attached to the stationary frame of the plotter 1.

Figure 3:
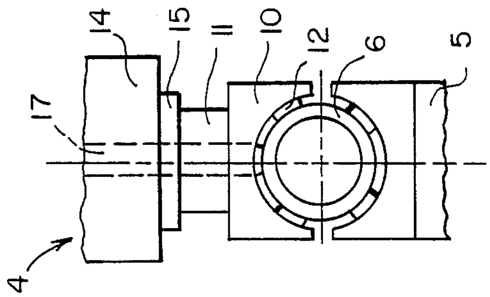
FIG. 3, in a view corresponding to FIG. 2, shows the holder in the pen magazine having the pen receptacle as well as the holder of the writing head that has been brought into engagement with the pen receptacle.
Figure 2:
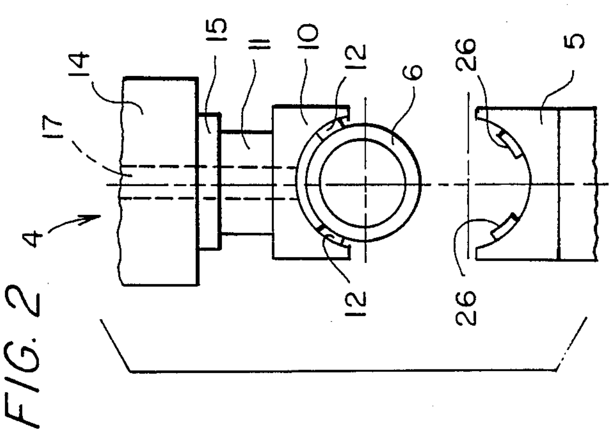
FIG. 2, in a schematic view, shows a holder from the pen magazine with a pen receptacle retained by it, as well as the opposed holder of the writing head.

In FIGS. 2 and 3, one of the holders 4 is shown in various states, with the holder 5 located facing it in various positions.

Figure 6:
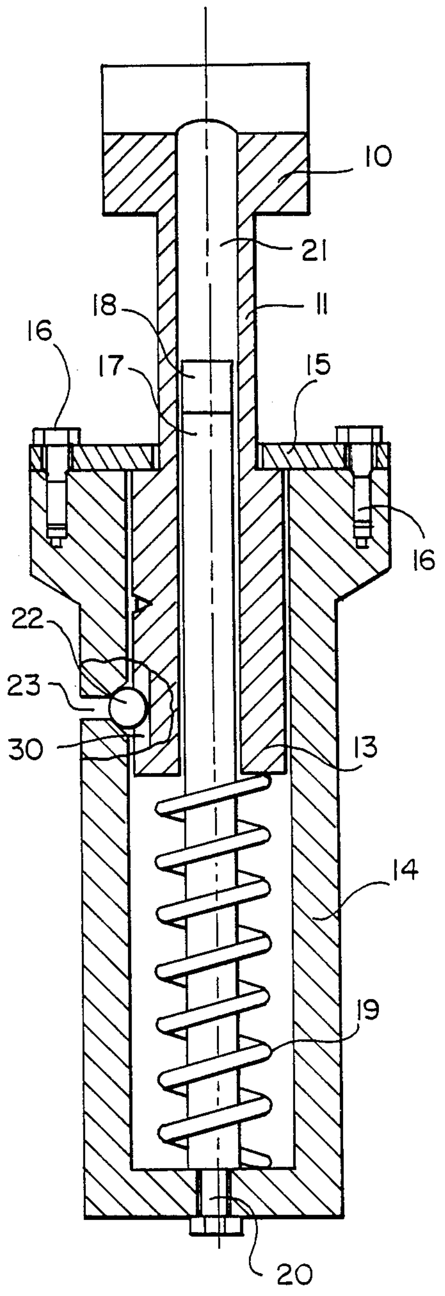
FIG. 6 is a section taken through the holder of FIG. 5 with a retaining element located in the separating position.
Figure 7:
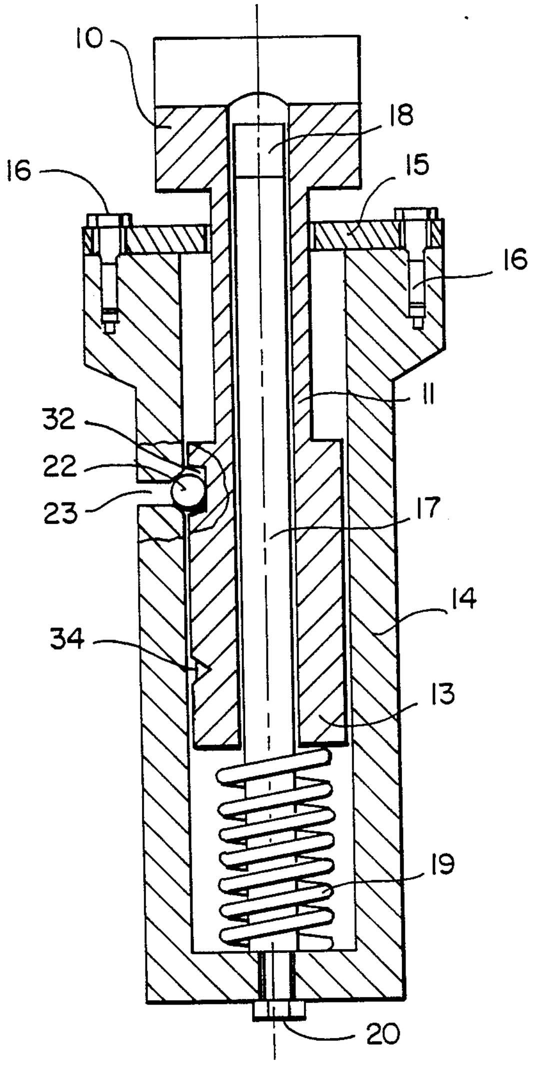
FIG. 7, in a section corresponding to FIG. 6, shows the holder with the retaining element in the retaining position.
Figure 8:
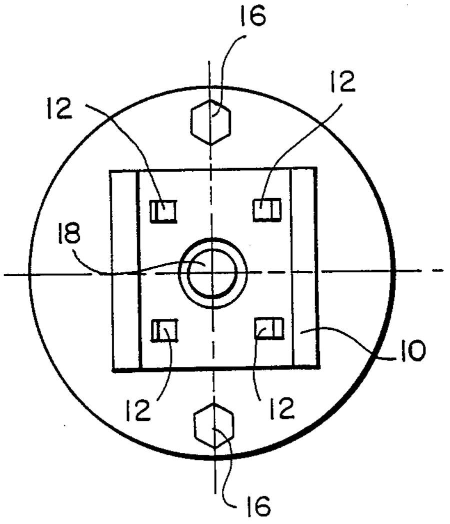
FIG. 8 is a view of the holder of FIG. 5 seen from the right end.
Figure 9:
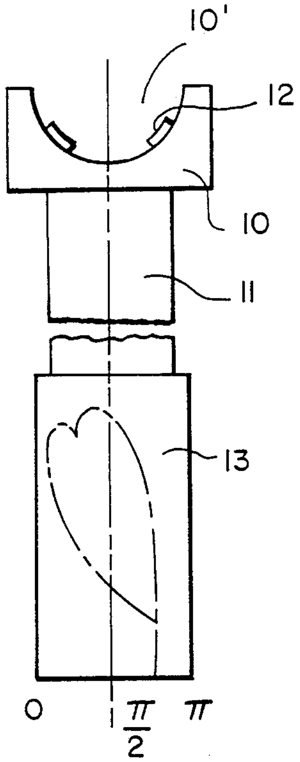
FIG. 9 is a schematic view of the portion of the holder of FIG. 5 having the receiving zone, in which the raceway of the raceway mechanism is indicated by dot-dash lines.
Figure 10:
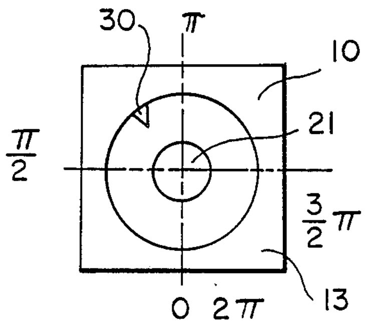
FIG. 10 is a view of the portion of the holder of FIG. 9 seen from the left end but with the location of the raceway rotated by 45°.

The holder 4 has two main elements, a carrier portion 14 and a portion retained in this carrier portion 14 comprising the sections 10, 11, 13 (see FIGS. 6 and 7). This portion has a receiving section 10 having a semicircular receiving zone 10' in which there are bearing protrusions, 12. Adjoining the receiving section 10 is a connection section 11, which connects the receiving section 10 to a cylindrical raceway support 13. A bore 21 extends coaxially through the raceway support 13, the connecting section 11 and the receiving section 10, which receives a writing instrument. A pin 17 that is within the bore 21 is secured with its rearward end to the bottom of the receiving portion 14 by means of a screw 20. On the forward end, the pin 17 has a permanent magnet 18. The rear end portion of the pin 17 is surrounded by a helical spring 19, supported at one end on the bottom of the receiving portion 14 and at the other on the rearward end of the raceway support, 13. In the position shown in FIG. 6, the spring presses the raceway support, with an annular shoulder provided in the transitional zone to the connecting section 11, against a two-piece closure plate 15, which is secured by means of screws 16 to the receiving portion 14. In the position shown in FIG. 6, the permanent magnet 18 is spaced relatively far apart from the receiving section 10 that defines the receiving zone 10', because the portion 10, 11, 13 is portruding relatively far out of the receiving portion 14.

Figure 5:
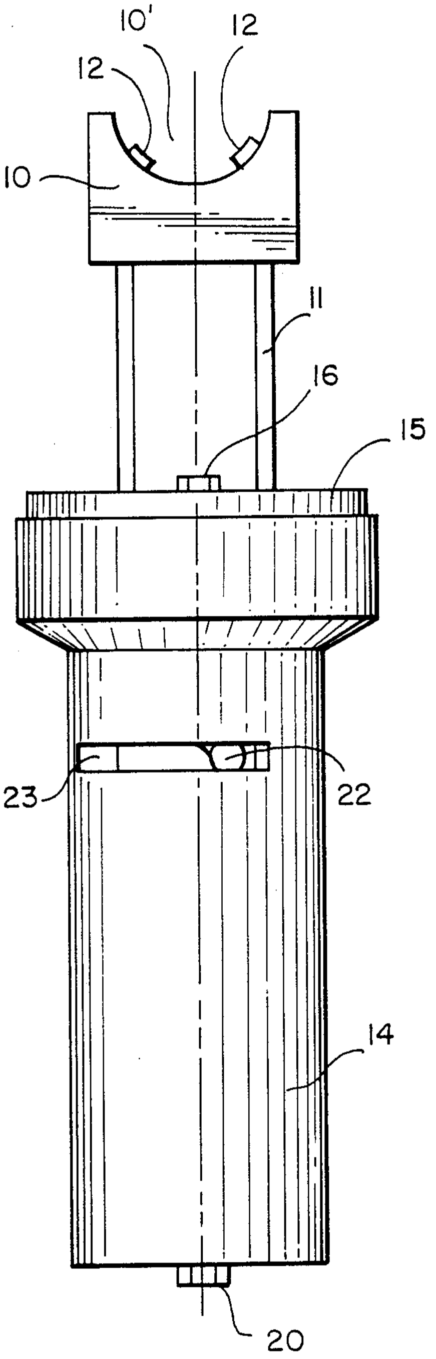
FIG. 5 is a view showing the holder from the pen magazine.

A raceway is formed on the outer face of the raceway support 13 and is part of a conventional raceway mechanism similar to the type shown in German Patent Disclosure Documents DE-OS No. 15 61 834 and DE-OS No. 14 61 643, incorporated herein by reference. A ball 22 (see FIGS. 5 and 6) guided in the raceway is part of this raceway mechanism and engages a slit 23, extending in the circumferential direction, in the receiving portion 14. Therefore, even the ball 22, is movable in the circumferential direction along the slit 23, the ball cannot be shifted in the axial direction of the receiving portion 14.

Figure 11:
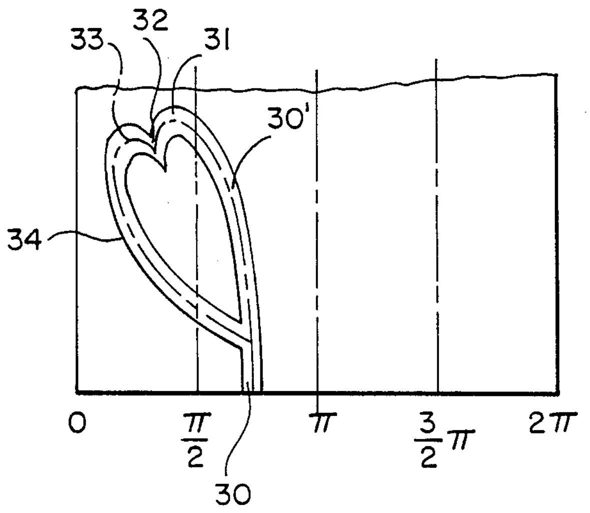
FIG. 11 is a layout view of the raceway of FIG. 9.

In the separating position shown in FIG. 6, the ball 22 is located in the segment 30 of the raceway (see FIG. 11), its location in the raceway being determined by the position of the raceway support 13 inside the receiving portion 14, which in turn is defined by the contact of the annular shoulder of the raceway support 13 with the closure plate 15 resulting from the pressure of the spring 19.

If the portion 10, 11, 13 is shifted inward into the receiving portion 14, for example by suitable pressure on the receiving section 10 counter to the force of the spring 19, then the ball 22 moves along the segment 30 and the segment 30' of the raceway (see FIG. 11) into the segment 31 of the raceway. The ball 22 follows the course of the raceway in the circumferential direction by means of its movement along the slit 23. If the force acting upon the receiving section 10 is withdrawn, the curvature of the course of the raceway causes the ball 22 to enter the zone 32 (see FIG. 11) of the raceway and become pressed by the force of the spring 19 into this zone, as a result of which the ball 2 prevents shifting of the portion 10, 11, 13 out of the receiving portion 14. In other words, the portion 10, 11, 13 thereby is retained in a position of repose. In this position, the magnet 18 is in its retaining position, closely adjacent to the face of the receiving section 10 defining the receiving zone 10'.

If pressure again is exerted upon the receiving section 10 in the direction of a shifting of the portion 10, 11, 13 into the receiving portion 14, the ball 22 is moved out of its FIG. 7 in the raceway segment 32 and into the raceway segment 33 (see FIG. 11), because of the inclination of the raceway course. Upon an ensuing withdrawal of force of the receiving section 10, the spring 19 presses the portion 10, 11, 13 back out of the receiving portion 14 and the position shown in FIG. 6 is regained.

Figure 4:
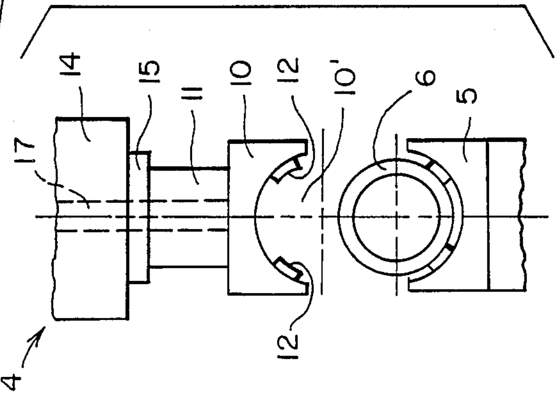
FIG. 4, in a view corresponding to FIGS. 2 and 3, shows the holder from the pen magazine with the portion having the receiving zone located in the reversing position, as well as the holder of the writing head with the pen receptacle retained in it.

The above-described different positions of the holder 4 are shown in FIGS. 2, 3 and 4. The operating position of FIG. 2 corresponds to the position in FIG. 7, in which the permanent magnet 18 is located adjacent the face of the receiving section 10 defining the receiving zone 10', and in FIG. 2 the permanent magnet 18 retains a pen receptacle 6 of ferromagnetic material by magnetic force, so that the pen receptacle 6 is in contact with the bearing protrusions 12 and securely is retained in the holder 4.

The movable holder 5 is located opposite the magazine holder 4, so that their longitudinal axes coincide. In the exemplary embodiment shown, two permanent magnets 26 forming protrusions are disposed in the receiving zone of the holder 5. However, it is also possible for the holder 5 to be embodied in the same fashion as the holder 4.

In order to remove the pen receptacle 6 from the holder 4 and transfer it to the holder 5, the holder 5 is moved toward the pen receptacle 6 by movement along its longitudinal axis (see FIG. 3). In this process the portion 10, 11, 13 is pressed farther into the receiving portion 14, so that on the one hand, as indicated in FIG. 3, the permanent magnet 18 protrudes somewhat beyond the face defining the receiving zone 10' of the receiving section 10. On the other hand, the ball 22 of the raceway mechanism is moved beyond the raceway segment 32 (see FIG. 11) into the beginning of the raceway segment 33.

If the holder is then retracted again, then the spring 19 presses the portion 10, 11, 13 out of the receiving portion 14, and into the position shown in FIG. 6, causing disengagement of the permanent magnet 18 from the ferromagnetic pen receptacle 6. The permanent magnets 26 now retain the pen receptacle 6 in the holder 5, so that the holder 5 receives the pen receptacle 6 in the manner indicated in FIG. 4. This reception is possible because during the movement of the holder 5 out of the position shown in FIG. 3, the portion 10, 11, 13 moves together with the holder 5 in the same direction, because of the pressure of the spring 19. In other words, the pen receptacle 6 is held clamped between the two holders 4 and 5, while the permanent magnet 18 moves away from the pen receptacle 6. As a result, the force of attraction of the permanent magnet 18 on the pen receptacle 6 decreases progressively, and the permanent magnets 26 are capable of retaining the pen receptacle 6 in the holder 5.

An equivalent process is involved in order to transfer the pen receptacle 6 from the holder 5 to the holder 4, whereby the pen receptacle 6 will be transferred into the holder 4 by the sequence of FIGS. 4, 3 and 2. To this end, the force of attraction of the permanent magnet 18, in its location adjacent the pen receptacle 6, must be greater than the force of attraction of the permanent magnets 26, so that the permanent magnet 18 firmly holds the pen receptacle 6 in the position shown in FIG. 2 when the holder 5 is moved away from the holder 4.

While a preferred embodiment of the invention has been described, the invention is to be defined by the scope of the appended claims;

I claim:

1. A device for exchanging objects, in particular writing instruments, between two holders (4, 5) that comprises a magazine holder (4) and a movable holder (5), which each holder having an opposed receiving section that has a longitudinal axis and is open on one side, means to move the movable holder relative to the magazine holder to transfer an object (6) by an approach in a plane extending substantially at right angles to the longitudinal axes of each holder, and a means to retain an object in at least one of said holders that comprises two retaining elements, one retaining element comprising a permanent magnet (18) and the other retaining element comprising an element (6) made of ferromagnetic material that surrounds said object, wherein in a retaining position holder the retaining elements (6, 18) are spaced close together, and in a separating position the retaining elements are spaced farther apart from one another than in the retaining position, characterized in that said means to retain an object further comprises a permanent magnet retaining element (18) that is within a receiving portion (14) of a holder and operatively is connected to a raceway mechanism (22, 23, 30, 31, 32, 33, 34) means that moves the permanent magnet retaining element (18) relatively near to a receiving zone (10') of the receiving section when that holder is in the retaining position and moves the permanent magnet (18) so as to be located farther away from the receiving zone (10') of the receiving section when that holder is in the separating position.

2. A device as defined in claim 1, characterized in that said means to retain an object further comprises a holder with a receiving section that further comprises several portions (10, 11, 13) that are interconnected and adapted to move within said receiving portion (14) so that when said holder is going from a position of repose to a reversing position the receiving zone (10') is movable counter to a spring pressure between said receiving portion (14) and a cylinder raceway support portion (13) that further comprises a raceway mechanism (19, 22, 23, 30, 31, 32, 33, 34) located between said cylinder raceway support portion (13) and said receiving portion (14).

3. A device as defined by claim 2, characterized in that said means to retain an object further comprises a retaining element (16) that secures the interconnected portions of the receiving section (10, 11, 12) for axial movement within said receiving portion (14), and said permanent magnet (18) is secured to the forward end of a pin (17), which is fixed to the receiving portion (14) and extends in a bore (21) axially located within the cylinder raceway support portion (13) so that the receiving zone (10') and interconnected receiving section portions axially are movable with respect to both the permanent magnet (18) and the receiving portion (14) of the holder.

* * * * *